Oct. 27, 1931.  A. E. NORTHUP  1,829,052

VEHICLE BODY CONSTRUCTION

Filed Jan. 28, 1927

INVENTOR.
AMOS-E-NORTHUP
BY
ATTORNEYS.

Patented Oct. 27, 1931

1,829,052

UNITED STATES PATENT OFFICE

AMOS E. NORTHUP, OF DETROIT, MICHIGAN, ASSIGNOR TO THE MURRAY CORPORATION OF AMERICA, A CORPORATION OF DELAWARE

VEHICLE BODY CONSTRUCTION

Application filed January 28, 1927. Serial No. 164,146.

The principal object of my invention is to provide a vehicle body which will combine the advantages of the closed bodies of the type described, now in use, with the advantages of open bodies of similar type.

With this and other objects in view, my invention consists in the arrangement, combination and construction of the various parts of my improved device, as described in the specification, claimed in my claim and shown in the accompanying drawings, in which:

Figure 1:
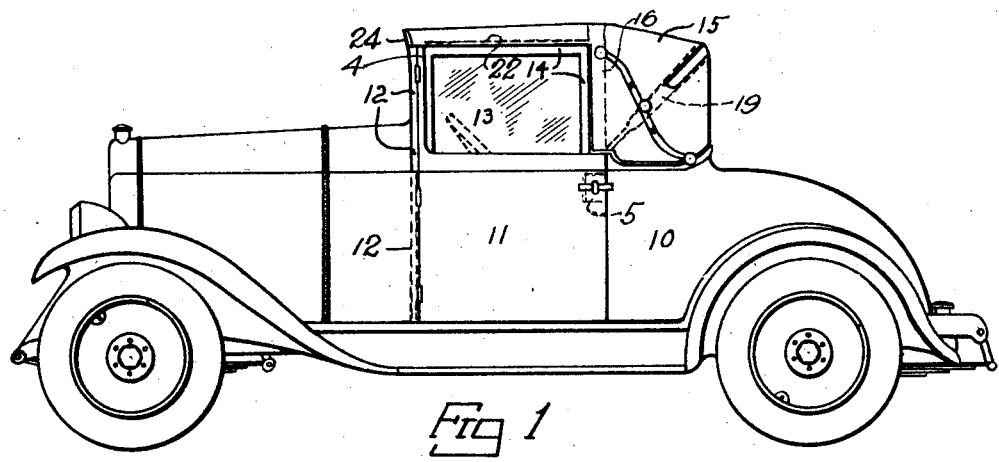
Fig. 1 is a side elevation of an automobile body embodying my invention.

It has heretofore been impossible to construct a two passenger automobile body which may, in fair weather, be converted into an open car and in inclement weather, changed into a closed car of the coupé type, with weather tight joints and having the vision which enclosed types permit. I have combined the advantages of both types in a single construction, as hereinafter described.

I have shown an automobile body 10 of the two passenger type, having a door 11 on each side thereof giving access to the passenger compartment. Each door 11 has a forward hinge pillar 4 hingedly secured to and extending the length of the windshield supporting pillars 12 and forming a window stile. Attached to each door 11 and slidable vertically in the plane thereof is a window glass 13 mounted in a frame 14. Each of the window glasses 13, including the frame 14, is of a width sufficiently less than the door to clear the inner edge of the latch mechanisms 5 indicated in dotted lines in Figs. 1 and 2, which are secured in the rear edges of the doors. Between the pillars 12 and extending from the top of the cowl to the roof cross piece or front transverse member 24 is positioned a transparent windshield panel 9 shown fragmentarily in Fig. 2.

Positioned around the upper rear sides, the back and the top of the passenger compartment is a top member 15 which includes a vertical supporting bow 16, the parallel portions of which are secured by screws 25 to the brackets 18 which are pivotally secured to the body 10 as at 17. A rear supporting bow 19 is pivotally secured to the brackets 18 by the members 20 as at 21 and extends upward and to the rear of the bow 16, as shown in Fig. 2.

It will be noted that the lower ends of the bracket 18 are bent to the rear thus suspending the rear edge of the bow 16 directly above the edges of the openings of the doors 11, and with the forward surfaces of the vertical portions of the bow 16 substantially in line with the inner edges of the latch mechanisms 5 thus permitting the pillar portions of the bow 16 to form abutting pillars or stiles for the window panels 13 when the doors 11 are closed. It will be understood that the left-hand ends of the bows 16 and 19 are secured to the left side of the body 10 in a manner and by means similar to that described and shown in Fig. 2.

Extending forwardly and at right-angles to the right vertical portion of the bow 16 and having its rear end movably doweled therein as at 23 is a rail 22 which is secured at its front end to the right end of the cross member 24. A bearing bracket 27 is secured to the rail 22 at a point intermediate its ends and the link 26 which is pivotally secured at one end to the upper end of the bracket 18 as at 31, and has a pin 28 in its opposite end which is pivotally positioned in the bearing bracket 27. The cross member 24 is movably positioned upon the tops of the pillars 12 and extends across the top of the windshield 9. The rail 22 may be folded along and parallel to the forward side of the right vertical portion of the bow 16 by swinging it forwardly and upwardly to release the dowel 23 and then moving the whole rail downwardly against the bow 16. A similar rail 22 indicated by the dotted lines in Fig. 1 is secured by a similar link 26 (not shown) as described, to the left vertical portion of the bow 16 (also indicated in dotted lines in Fig. 1) and has its forward end secured to the left end of the cross member 24 so that the whole forward part of the top including the cross member 24 positioned forwardly of the bow 16 may be folded back as a unit against the bow 16. When the top is in raised position the lower surfaces of the rails 22 form abutments or stiles for the top edges of the windows 13 and their frames 14 as shown in Fig. 1.

Figure 2:
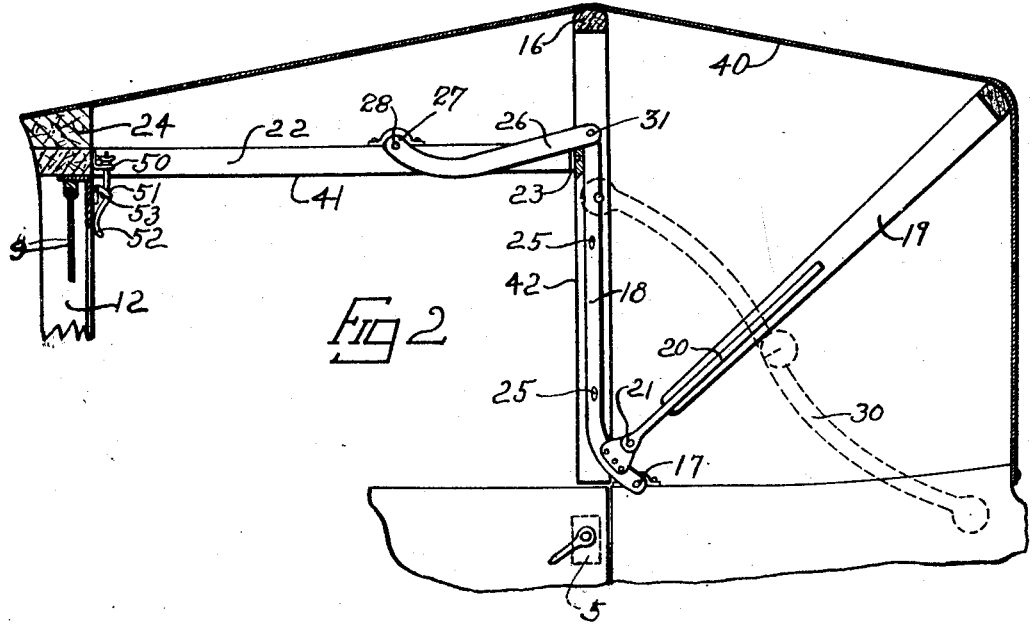
Fig. 2 is a longitudinal section of an automobile body embodying my invention.

Breaking braces 30 are positioned upon each side of the top as illustrated in Figs. 1 and 2, one end of each being pivotally attached to the side of the bow 16 and the other ends being pivotally secured to the rear upper portion of the body 10 upon each side of the passenger compartment. A non-rigid and weather proof covering material 40 is draped over and suitably secured in any conventional manner to the cross member 24, the outer sides and lower edges of the rails 22, the bows 16 and 19, and the upper edges of the body 10 around the rear sides and back of the passenger compartment. Windlaces 41 and 42 may be secured along the edges of the rails 22 and the vertical portions of the bow 16 in position to cover the joint between the windows 13 and the bow 16 and rails 22 when the door 11 is in closed position and the window 13 in raised position, thus providing a weather-tight joint.

When it is desired to lower the top the braces 30 are broken downward at their middle joints, the rails 22 carrying the cross member 24 are swung on links 26 and folded upon and parallel to the bow 16, the bow 16 is then moved backward on the pivots 17 and folded upon and parallel to the bow 19, and the entire assembly then folded down around the rear side and back edges of the passenger compartment. For securing the top in raised position brackets 50 having slots (not shown) may be provided on the cross member 24 adjacent the ends of the pillars 12, securing levers 52 pivotally secured as at 53 to the pillars 12 adjacent their tops and the brackets 50, and latches 51 pivotally secured by an end to the intermediate portions of the levers 52, and having nuts on their free ends for removably engaging the slotted brackets 50. To operate, the levers 52 are swung outwardly and upwardly so that the latches 51 may be moved into the slots of the brackets 50 and positioned with their nuts engaging the upper surfaces of the brackets on each side of the slots,—the ends of the levers 52 are then moved downwardly against the pillars 12 thereby drawing the nuts on the latches 51 against the brackets 50 and clamping the cross member 24 in position. The windows 13 are movably positioned in the doors 11 in the conventional manner so that they may be lowered and enclosed entirely within the doors 11, or may be raised as desired until they close the space between the upper edges of the door and the top. The forward edges of the doors are provided with conventional hinge pillars 4 which extend to the top of the windshield and the pillars 12, and which may have in their inner edge portions conventional runways to accommodate the forward edges of the windows 13; and it will be seen that the described construction permits the use of one-piece rails, and also the use of links pivoted thereabove, between the ends of the rails, to connect said rails at a higher level to the upper ends of brackets 18,—concealed within bow 16.

It will be obvious that various changes may be made in the arrangement, combination and construction of the various parts of my improved device without departing from the spirit of my invention, and it is my intention to cover by my claim such changes as may be reasonably included within the scope thereof.

What I claim is:

In a vehicle body having a passenger section and a windshield closing the forward end of said section above the cowl, the combination of a door having a forward pillar extending above the upper edge thereof to the top of the windshield and hingedly secured to the side of the windshield structure, a transparent window panel carried by and vertically slidable in said door with its forward edge guided in said forward door pillar and its rear edge movable in a vertical plane forward of the rear edge of said door, and a collapsible top for said passenger section having in addition to a transverse front member adjacent said windshield and one-piece rails secured thereto, both a bow member movably connected to said body at the rear edge of said door opening, and adapted when in vertical position to overhang the rear margin of said door and provide an abutment for the rear vertical edge of said window panel when it is raised above the top of said door, and links extending between straight portions of said bow and said rails,—inner faces of said straight portions being each provided with a longitudinally extending bracket whose respective ends are provided with pivots, a lower pivot thereof serving to provide the mentioned movable connection and an upper pivot thereof serving to secure said links.

AMOS E. NORTHUP.